June 11, 1929.                I. A. WEAVER                1,717,131
                    VEHICLE WHEEL ALIGNMENT INDICATOR
                          Filed May 18, 1928
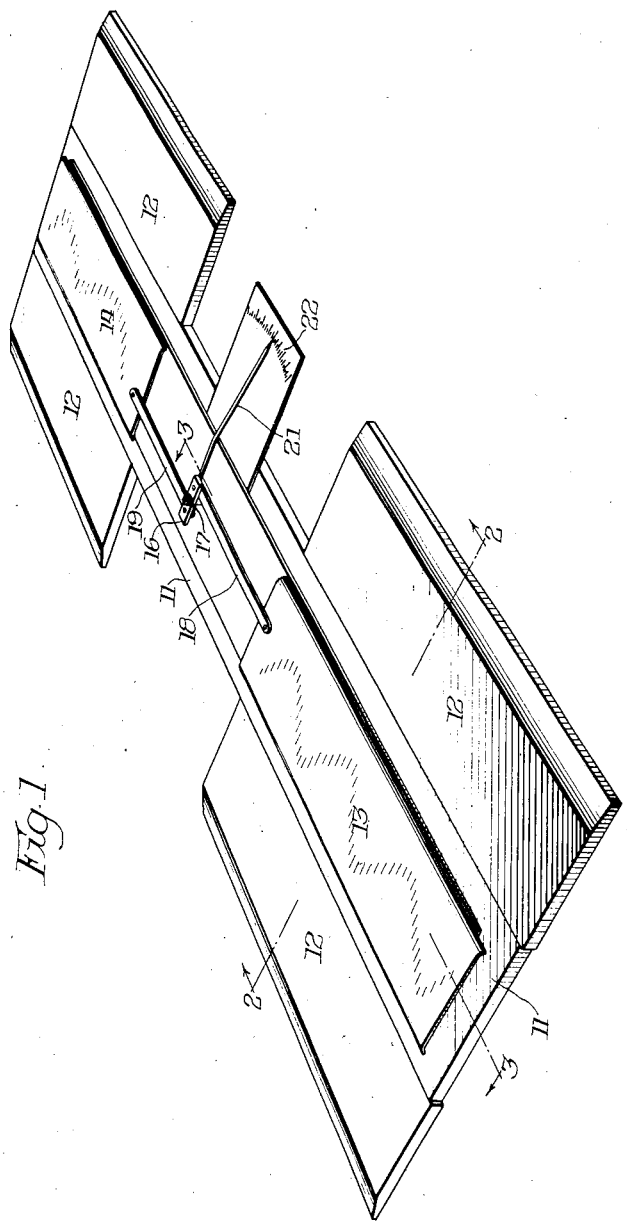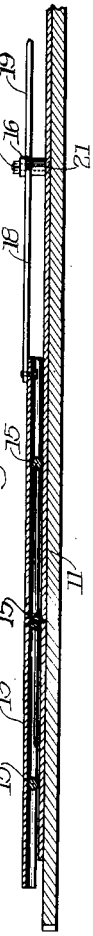

Patented June 11, 1929.

1,717,131

UNITED STATES PATENT OFFICE.

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

VEHICLE WHEEL-ALIGNMENT INDICATOR.

Application filed May 18, 1928. Serial No. 278,686.

My invention relates to novel and improved means for showing or denoting misalignment or improper disposition of vehicle-wheels and aims to overcome and avoid some of the objectionable features of earlier proposed constructions.

In the preferred embodiment of the present invention, two, flat, horizontal plates are employed in register with one another and spaced apart end to end properly so that one wheel of the vehicle may roll over one such plate while its opposite or companion wheel rides over the correlated plate, the pair of plates being connected together by an equalizing mechanism whereby the movement of one or both plates occasioned by their improper alignment or adjustment will be transmitted to the equalizer, the movements of which are made readily apparent by a suitable indicator.

One difficulty encountered in attempting to use an alignment indicator consisting of a single plate adapted and arranged to be shifted sidewise by one wheel only of the vehicle as it passes over the plate is that the weight of the car must necessarily move sidewise one-half of the distance that the plate travels, which requires the expenditure of considerable power or force as the speed at which the car crosses the plate is increased.

When the front wheels of the automobile toe in or out, and one passes over such a plate mounted on an anti-friction bearing, the opposite wheel must change the direction of travel of the car.

If the surface on which the alignment indicator rests slopes at an angle, it will not give a true reading of the movement of the plate.

Furthermore, when the car is equipped with pneumatic tires, their flexibility becomes an important factor when the direction of travel of the car is changed, and this is also true if the instrument rests on a surface that slopes at right angles to the direction of travel of the car. Under such circumstances, when one wheel rolls over the plate carried by anti-friction bearings, the entire side thrust is thrown or shifted on to the opposite wheel. The resilience of the tire causes an objectionable additional movement of the plate.

The prime aim and leading purpose of the present invention is to supply an appropriate and simple construction which is free from the defects above specified and others and which will give reliable readings as to the conditions of the car wheels.

An additional object of the invention is to provide a structure of the indicated type and character which is of rugged construction, which can be economically manufactured, and which will give efficient service without substantial likelihood of becoming deranged or injured during ordinary use.

To permit those skilled in this art to have a full and complete understanding of the invention, both from structural and functional standpoints, in the accompanying drawing, forming a part of this specification, a present, desirable, and preferred embodiment of the invention has been illustrated, and, for simplicity, like reference characters have been used throughout the several views to designate the same parts.

In this drawing:

Figure 1 is a perspective view of the appliance;

Figure 2 is a cross-section through the apparatus; and

Figure 3 is a fragmentary longitudinal section through the device.

Referring to this drawing, it will be noted that the new appliance is designed or constructed to rest on any suitable or appropriate flat surface, such as the floor of a garage, so that the vehicle may be driven over it with ease.

It comprises a shallow, elongated base 11 which has opposite inclined approaches 12, 12 at its two ends, whereby the vehicle to be tested may ride over the apparatus with facility and convenience.

Two, metal or other suitable plates 13 and 14, arranged in longitudinal register with one another with their adjacent ends suitably spaced apart, are mounted in any fitting or proper manner on anti-friction bearings 15, 15 of any appropriate form or style on the base 11, thus giving the plates freedom of movement toward and from one another endwise.

Midway between the plates, an equalizer-bar 16 is pivoted or hinged at its center at 17 on the base 11, a link 18 connecting sliding plate 13 to one end of the equalizer, and another link 19 of like length connecting the companion plate 14 with the other end of the equalizer, such three members 16, 18 and 19 constituting an equalizing means connected to the two sliding plates.

In order that the movements of such equalizer element may be clearly seen and magnified, it is provided with a pointer or index 21 designed and arranged to travel over a suitable scale or series of graduations 22 having a central zero point.

From the foregoing, it will be obvious that the vehicle whose two wheels pass over the two plates at the same time is free to move sidewise in either direction by reason of the engagement of its wheels with the plates borne on anti-friction mountings.

If the two wheels are in proper alignment or correct position with suitable intoe, such condition will be shown by the movement of the index over the scale, but, on the other hand, if either wheel is mal-positioned, such circumstance or situation is likewise indicated by the movement of the pointer.

The plates, being connected together in the manner indicated, the appliance may be used for testing the alignment of either the front or rear wheels of the automobile, and the mass of the car will not have to move sidewise during the testing operation, the in or out toe of each wheel moving the corresponding plate in or out a proportionate amount.

If the instrument rests on a sloping surface, one plate will move up and the other down, exactly balancing each other when the weight of one end of the car rests on the two plates.

The invention is not limited and restricted to the precise and exact details of construction shown and described and these may be modified within comparatively wide limits without departure from the heart and essence of the invention as defined by the appended claims and without the loss or sacrifice of any of its material benefits and advantages.

I claim:

1. In a vehicle-wheel alignment indicator, the combination of a pair of plates movable toward and from one another and over which the pair of wheels of a vehicle are adapted to roll simultaneously, a stationary base, an equalizer pivoted on said base, links connecting said plates with said equalizer on opposite sides of its pivot, and means to indicate the movement of said equalizer.

2. In a vehicle-wheel alignment indicator, the combination of a pair of plates movable toward and from one another and over which the pair of wheels of a vehicle are adapted to roll simultaneously, a stationary base, an equalizer between the adjacent ends of said plates pivoted on said base, links connecting said plates with said equalizer on opposite sides of its pivot, a pointer rigid with said equalizer, and a graduated member with which said pointer cooperates.

3. In a vehicle-wheel alignment indicator, the combination of a pair of plates mounted to be movable toward and from one another and on which the vehicle wheels are adapted to roll, and equalizing means connecting said plates together.

4. In a vehicle-wheel alignment indicator, the combination of a pair of plates mounted to be movable toward and from one another and on which the vehicle wheels are adapted to roll, equalizing means connecting said plates together, and an indicator to show the movements of said equalizing means.

5. In a vehicle-wheel alignment-indicator, the combination of a pair of members mounted to be movable toward and from one another by the rolling contact of the opposite wheels of a vehicle therewith, and equalizing means connecting said members together and compelling such members to move equally in opposite directions toward one another or equally in opposite directions from one another.

6. In a vehicle-wheel alignment-indicator, the combination of a pair of members mounted to be movable toward and from one another by the rolling contact of the opposite wheels of a vehicle therewith, and equalizing means connecting said members together and compelling such members to move equally in opposite directions toward one another or equally in opposite directions from one another, said means comprising an indicator to show the movements of said members.

In witness whereof I have hereunto set my hand.

IRA A. WEAVER.